Oct. 31, 1961 R. G. GOLDMAN 3,006,184
ULTRASOUND THICKNESS GAUGE
Filed June 17, 1957
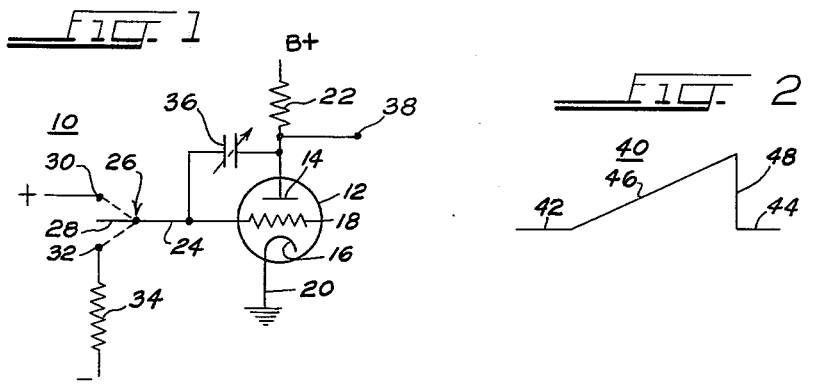
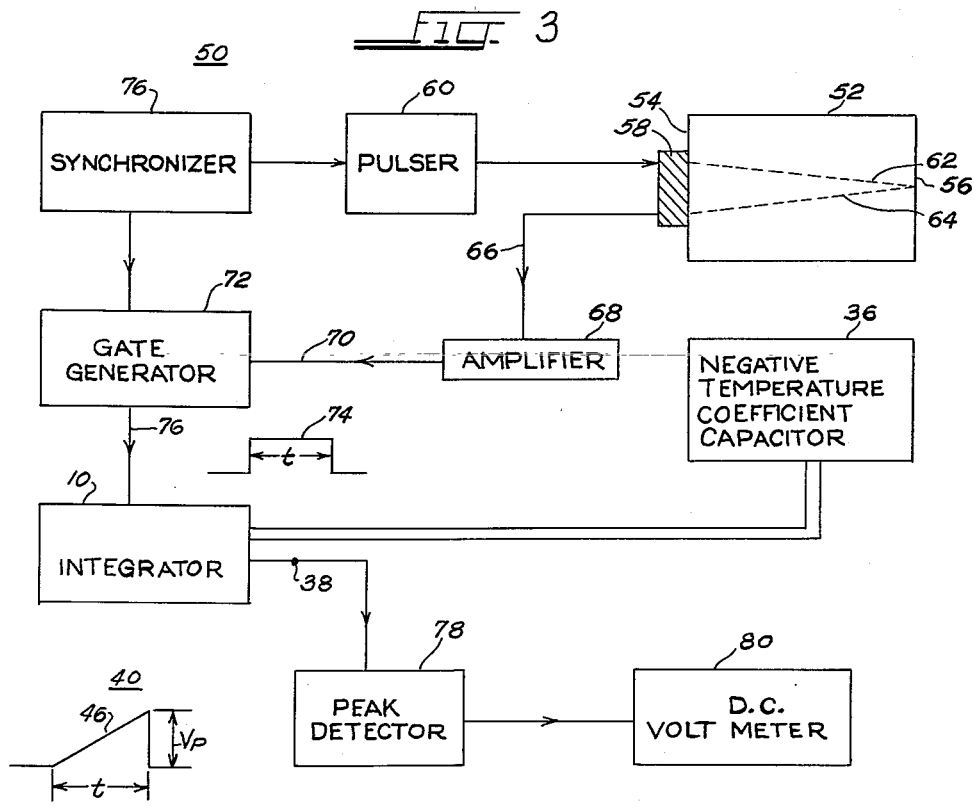
INVENTOR.
RICHARD G. GOLDMAN
BY
Smith, Olsen, Baird & Miller,
ATT'YS.

United States Patent Office 3,006,184
Patented Oct. 31, 1961

3,006,184
ULTRASOUND THICKNESS GAUGE
Richard G. Goldman, Schenectady, N.Y., assignor to General Electric Company, a corporation of New York
Filed June 17, 1957, Ser. No. 665,904
4 Claims. (Cl. 73—67.8)

This invention relates to generators for saw tooth wave forms and particularly to generators in which the shape of the saw tooth portion of the wave form can be varied or modulated and apparatus incorporating such a generator.

The saw tooth generator of the present invention is of the general type utilizing a socalled "Miller integrator" which is capable of generating a positive or negative going saw tooth wave form. A Miller integrator utilizes a capacitance connected between the anode and control grid of an amplifying stage to determine the slope of the saw tooth portion of the wave form. In general the value of this capacitance has been fixed in the installations utilized heretofore whereby to produce as an output from the Miller integrator a saw tooth wave form having one predetermined slope.

Saw tooth wave generators of this type find useful applications in various electrical circuits and particularly certain measuring circuits. For example such saw tooth generators are particularly useful in ultrasonic measuring devices including ultrasonic thickness gauges. In the use of ultrasonic thickness gauges changes in temperature of the material being measured materially change the speed of sound therethrough and, accordingly, will change the apparent thickness thereof unless suitable corrections are made. Such corrections have heretofore been made by calculations or suitable steps have been taken to eliminate variations in the testing conditions.

In certain measuring applications an air gap forms at least part of the ultrasound travel path. The speed of sound through air will vary in accordance with the temperature, pressure and humidity of the air. For example the velocity of sound through air varies with temperature in accordance with the formula $$V = 331.5 + 0.607t$$

in which $t$ is the temperature in degrees centigrade. If the corrections for these conditions are made mathematically the correcting process is tedious and time consuming and if correction is made by controlling the testing conditions then the places for testing are substantially limited and curtailed.

Changes in operating conditions also affect the electrical components of the test equipment whereby to introduce additional errors in the test results. Compensation for these additional errors is also a tedious and time consuming process.

Accordingly, it is an object of the present invention to provide a new and improved ultrasound thickness gauge in which automatic compensation is made for temperature variations.

Another object of the invention is to provide an ultrasound measuring device in which automatic compensation is made for temperature, air pressure, relative humidity and electrical component changes in response to the preceding conditions.

These and other objects and advantages of the invention will be better understood from the following description when taken in conjunction with the accompanying drawings. In the drawings wherein like reference numerals have been utilized to designate like parts throughout:

FIGURE 1 is an electrical schematic diagram of a saw tooth wave form generator made in accordance with and embodying the principles of the present invention;

FIGURE 2 is a diagram of the output saw tooth wave form of the generator in FIGURE 1; and FIGURE 3 is a schematic diagram in block form of an ultrasound measuring device incorporating the saw tooth wave form generator of FIGURE 1 therein.

Referring to the drawings and particularly FIGURE 1 thereof there is shown a saw tooth wave generator generally designated by the numeral 10 and made in accordance with and incorporating the principles of the present invention. Generator 10 is of the type generally known as a Miller integrator. Such an integrator is capable of generating either a positive going or a negative going wave form. For purposes of illustration the operation of generator 10 will be described in the generation of a positive going output. A negative going output can be developed by reversing the polarity of the quiescent and sweep generating conditions as is well known in the art.

Generator 10 includes a high vacuum triode 12 provided with the usual anode or plate 14, cathode 16 and control grid 18. It is to be understood that other amplifying devices such as semi-conductors may be utilized in the place of the high vacuum tube 12. Cathode 16 is connected through a lead 20 to ground. Anode 14 is connected through a resistance 22 to a suitable B+ supply. Control grid 18 is connected to a line 24 which is in turn connected to a switch generally designated by the numeral 26 and including a two position switch arm 28. The upper switch contact 30 is connected to a source of positive voltage and the lower contact 32 is connected through a resistance 34 to a source of negative potential. Connected between the anode 14 and the control grid 18 is a capacitance 36 which is shown as being variable in character.

The generator 10 of FIGURE 1 operates as follows. In the quiescent condition, switch arm 28 is positioned upwardly against contact 30 whereby a positive voltage is applied to control grid 18. This causes tube 12 to conduct heavily through the plate resistance 22. As a result the potential at plate 14 drops to a relatively low value. Switch arm 28 is then moved to make contact with contact 32 whereby to apply a negative voltage through resistance 34 to control grid 18. Preferably the negative voltage is sufficient to cut off tube 12. The potential on plate 14 therefore tends to rise instantaneously to the value of the B+ supply.

Instead of rising instantaneously to the B+ supply, the potential on plate 14 rises slowly because of the presence of the capacitance 36. Capacitance 36 in effect provides a relatively low impedance path for alternating current fed back across resistance 34. As a result the potential on plate 14 rises at a comparatively slow linear rate. More specifically, the potential appearing on the output contact 38 connected to plate 14 rises in a saw tooth manner as is illustrated in FIGURE 2 of the drawings. The potential at point 38 can rise to the value of the B+ supply if tube 12 is cut off for a sufficient length of time. In practice switch arm 28 is moved from contact 32 to contact 30 before the potential at point 38 reaches B+ potential whereby to cause tube 12 to begin heavy conduction. Heavy conduction of tube 12 causes a sharp drop in the potential appearing on plate 14 and output contact 38.

The resulting complete wave form appearing on output 38 is illustrated in FIGURE 2 of the drawings and is generally designated by the numeral 40. The wave form portions 42 and 44 correspond to the quiescent state of the generator, i.e., when contact arm 28 is connected to contact 30 and tube 12 is heavily conducting.

The positive going portion of the wave form 40 is designated by the numeral 46 and is that portion of the wave form generated while contact arm 28 is against contact 32. The negative going portion 48 of wave form 40 is that portion generated after contact arm 28 is rapidly moved from contact 32 to contact 30 and represents the sudden heavy conduction of tube 12 upon the application of the positive potential to control grid 18.

In the above analysis of the operation of the circuit, the application of the positive and negative potentials to control grid 18 has been described in electromechanical terms. Preferably in actual use the switch 26 is replaced by electronic devices which can alternately apply positive and negative potentials to control grid 18.

In the present generator 10, the plate to grid feed back capacitance 36 is made variable. Capacitance 36 may be for example a temperature sensitive capacitor, the capacitance value of which changes with temperature.

Such capacitors may have either negative temperature coefficients or positive temperature coefficients. Changes in the temperature of the media surrounding capacitance 36 would therefore modulate the positive going portion 46 of wave form 40 in a manner proportional to the changes in temperature.

Instead of being temperature responsive, capacitor 36 might be humidity responsive. In such an installation the slope of wave portion 46 would be modulated in accordance with changes in humidity of the atmosphere surrounding capacitor 36. On the other hand capacitance 36 might be arranged to be pressure responsive, the plates of the capacitor being moved toward and away from each other in accordance with increases and decreases in the pressure of the surrounding media. In this case the slope of wave portion 46 would be modulated in accordance with pressure variations.

It also is contemplated that capacitor 36 might be of the movable plate type in which the plates are moved relative to each other by mechanical or electrical-mechanical means. Any desired type of intelligence accordingly could be impressed upon wave form 40 by changing the positions of the plates of capacitor 36. Such intelligence could be transmitted to another station or device and there decoded to recover the intelligence.

Another way in which intelligence could be impressed upon wave form 40 would be to make the capacitor 32 the plates of a condenser microphone. It will be understood that other intelligence responsive devices which can employ capacitances or capacitors can be utilized to impress intelligence by modulation upon wave form 40.

Referring to FIGURE 3 of the drawings there is shown a specific application of the wave form generator of FIGURE 1. More specifically there is illustrated in block diagram an ultrasound thickness gauge generally designated by the numeral 50. Gauge 50 is shown applied to the measurement of the thickness of a suitable test object 52 having a first surface 54 and a second surface 56, gauge 50 being used to measure precisely the distance between surfaces 54 and 56.

Gauge 50 includes an ultrasound transducer generally designated by the numeral 58 which may be in the form of a suitable crystal. Transducer 58 is driven by the usual pulser 60 which is effective to cause emission from transducer 58 of a pulse of ultrasound which travels along the path diagrammatically represented at 62. The pulse of ultrasound is reflected from surface 56 and travels a second time through object 52 along a path designated 64 which terminates at surface 54 and is there picked up by transducer 58. The received ultrasound signal is transmitted along a line 66 to amplifier 68 and is suitably amplified and thereafter transmitted along the line 70 to a gate generator 72.

Gate generator 72 is effective to generate a wave form generally designated by the numeral 74. The leading edge of the wave form is triggered or initiated by an output from a synchronizer 76. Synchronizer 76 also initiates operation of pulser 60 so that the leading edge of wave form 74 is generated at the same time that pulser 60 drives transducer 58 to produce a pulse of ultrasound. The output from amplifier 68 along line 70 when fed to gate generator 72 interrupts the generation of wave form 74 and thereby generates the trailing edge of wave form 74. The result is the generation of a wave form 74 having a time duration $t$ equal to the elapsed time between the entry of the ultrasound through face 54 and the receipt of the reflected pulse of ultrasound from surface 56 at transducer 58.

Wave form 74 is then fed along line 76 as the synchronized input to a saw tooth wave generator 10 of the type illustrated in FIGURE 1 of the drawings. The output at point 38 from the saw tooth generator or Miller integrator 10 is the saw tooth wave form 40 in which the positive going portion 46 of the wave form has a time duration $t$ exactly equal to the time duration $t$ of the output 74 from gate generator 72 and therefore equal to the time for travel of the pulse of ultrasound from surface 54 to surface 56 and back again. If the positive going portion 46 of form 40 is linear, the voltage or current rise along wave form 46 is directly proportional to the elapsed time interval $t$. Therefore the time interval $t$ can be measured by measuring the peak of the positive going wave portion 46. This measurement of the most positive point of wave form 40 is accomplished in a peak detector 78 connected to output 38 from the Miller integrator 10. The output from peak detector 78 is fed to a D.C. volt meter 80 where the peak voltage of wave form 40 can be directly read. The indicating scale of volt meter 80 can be directly calibrated in time or distance as desired.

The advantages of the saw tooth wave generator 10 of the present invention are realized in the circuit of FIGURE 3 by forming capacitor 36 as a negative temperature coefficient capacitor. Capacitor 36 is positioned in the vicinity of the object 52 which is to be measured. Accordingly, any temperature changes to which object 52 is subjected are also applied to capacitor 36. The temperature coefficient of capacitor 36 is chosen to be equal to or identical with that of object 52. By this connection the slope of wave form 40 is modulated directly to compensate for changes in temperature of the object 52 being measured. As a result the output on volt meter 80 is constantly being corrected automatically for temperature changes thus eliminating any need for subsequent correction of the values read.

It will be seen that there has been provided a saw tooth wave form generator which can be readily modulated and circuits employing such a generator which fulfill the objects and advantages set forth above. Although certain preferred forms of the invention have been shown for purposes of illustration, it is to be understood that various changes and modifications can be made therein without departing from the spirit and scope of the invention. Accordingly, the invention is to be limited only as set forth in the following claims.

What is claimed is:

1. An ultrasound thickness gauge comprising an electromechanical vibration transducer, a pulser providing electrical pulses to drive said transducer, an amplifier connected to said transducer to amplify echo pulses detected thereby, a gate generator, a synchronizer simultaneously to cause operation of said pulser and to begin operation of said gate generator, means interconnecting said amplifier and said gate generator, a saw tooth wave form generator including an amplifying device having a first electrode and a second electrode, a load resistance having one end thereof connected to said first electrode and the other end thereof connected to a source of B+ potential, means interconnecting the output of said gate generator and said second electrode so that the output of said gate generator controls the flow of current through said amplifying device, a variable capacitor having a negative temperature coefficient of capacitance and positioned adjacent to said transducer and connected between said first electrode and said second electrode, a peak volttage detector connected across said load resistance, and a D.C. volt meter to indicate the output from said peak detector.

2. An ultrasound thickness gauge comprising an electro-mechanical vibration transducer, a pulser providing electrical pulses to drive said transducer, an amplifier connected to said transducer to amplify echo pulses detected thereby, a gate generator, a synchronizer simultaneously to cause operation of said pulser and to begin operation of said gate generator, means interconnecting said amplifier and said gate generator, a saw tooth wave form generator including a high vacuum amplifying tube having a cathode and an anode and a control grid, a load resistance having one end thereof connected to said anode and the other end thereof connected to a source of B+ potential, means interconnecting the output of said gate generator and said control grid, a variable capacitor having a negative temperature co-efficient of capacitance and positioned adjacent to said transducer and connected between said anode and said control grid, a peak voltage detector connected across said load resistance, and a D.C. volt meter connected to said peak voltage detector.

3. An ultrasound thickness gauge for measuring the thickness of an object comprising an electro-mechanical vibration transducer, a pulser providing electrical pulses to drive said transducer, an amplifier connected to said transducer to amplify echo pulses detected thereby, a gate generator, a synchronizer simultaneously to cause operation of said pulser and to begin operation of said gate generator, means interconnecting said amplifier and said gate generator, a saw tooth wave form generator including an amplifying device having a first electrode and a second electrode, a load resistance having one end thereof connected to said first electrode and the other end thereof connected to a source of B+ potential, means interconnecting the output of said gate generator and said second electrode so that the output of said gate generator controls the flow of current through said amplifying device, means for measuring the peak amplitude of the saw tooth wave form generated, and a variable capacitor connected between said first electrode and said second electrode and having the capacitance thereof variable in accordance with the temperature of the object being measured to change the slope of the saw tooth wave form generated so as to obtain the same peak amplitude for different temperatures of the object being measured.

4. An ultrasound thickness gauge for measuring the thickness of an object comprising an electro-mechanical vibration transducer, a pulser providing electrical pulses to drive said transducer, an amplifier connected to said transducer to amplify echo pulses detected thereby, a gate generator, a synchronizer simultaneously to cause operation of said pulser and to begin operation of said gate generator, means interconnecting said amplifier and said gate generator, a saw tooth wave form generator including an amplifying device having a first electrode and a second electrode, a load resistance having one end thereof connected to said first electrode and the other end thereof connected to a source of B+ potential, means interconnecting the output of said gate generator and said second electrode so that the output of said gate generator controls the flow of current through said amplifying device, means for measuring the peak amplitude of the saw tooth wave form generated, and a variable capacitor connected between said first electrode and said second electrode and having a negative temperature coefficient of capacitance so that the capacitance thereof is variable in accordance with the temperature of the object being measured to change the slope of the saw tooth wave form generated so as to obtain the same peak amplitude for different temperatures of the object being measured.

References Cited in the file of this patent

UNITED STATES PATENTS

| | | |
|---|---|---|
| 1,951,276 | Edwards et al. | Mar. 13, 1934 |
| 2,681,411 | Washburn | June 15, 1954 |
| 2,780,795 | Ambrosio | Feb. 5, 1957 |
| 2,888,824 | Henry | June 2, 1959 |